(12) United States Patent
Murooka

(10) Patent No.: US 8,636,207 B2
(45) Date of Patent: Jan. 28, 2014

(54) SHOP TERMINAL AND INFORMATION PROCESSING SERVER

(75) Inventor: Yusuke Murooka, Tokyo (JP)

(73) Assignee: Sony Corporation, Tokyo (JP)

( * ) Notice: Subject to any disclaimer, the term of this patent is extended or adjusted under 35 U.S.C. 154(b) by 502 days.

(21) Appl. No.: 12/575,862

(22) Filed: Oct. 8, 2009

(65) Prior Publication Data

US 2010/0089994 A1    Apr. 15, 2010

(30) Foreign Application Priority Data

Oct. 9, 2008    (JP) ................................. 2008-262377

(51) Int. Cl.
*G06K 5/00* (2006.01)
(52) U.S. Cl.
USPC ......................................... 235/383; 235/380
(58) Field of Classification Search
USPC ......... 235/380, 383, 375, 382, 492, 486, 487; 705/1.1, 14.24, 14.38, 14.28, 14, 705/14.36, 14.41, 14.27
See application file for complete search history.

(56) References Cited

U.S. PATENT DOCUMENTS

| 5,649,114 A * | 7/1997 | Deaton et al. ............... 705/14.35 |
| 2005/0021400 A1 * | 1/2005 | Postrel ............................ 705/14 |
| 2006/0079247 A1 * | 4/2006 | Ritter .......................... 455/456.1 |
| 2006/0144927 A1 | 7/2006 | Love et al. |
| 2007/0118477 A1 | 5/2007 | Graves et al. |
| 2008/0086368 A1 * | 4/2008 | Bauman et al. ................. 705/14 |
| 2009/0009322 A1 * | 1/2009 | Ramirez et al. .......... 340/539.13 |
| 2009/0216643 A1 * | 8/2009 | Yamada ......................... 705/14 |
| 2010/0223118 A1 * | 9/2010 | Postrel ...................... 705/14.24 |

FOREIGN PATENT DOCUMENTS

JP    2007-213281    8/2007

OTHER PUBLICATIONS

European Search Report dated Aug. 19, 2010 for corresponding European Application No. 09252240.8.

* cited by examiner

*Primary Examiner* — Thien M Le
(74) *Attorney, Agent, or Firm* — K&L Gates LLP

(57) ABSTRACT

An information processing device is provided including: an identification information obtaining section configured to obtain identification information from an integrated circuit chip; a guidance information outputting section configured to output guidance information of a shop for the obtained identification information; and a guidance completion information transmitting section configured to transmit guidance completion information including the obtained identification information and information identifying the shop to a server.

16 Claims, 14 Drawing Sheets

FIG. 6

| GROUP ID | FRANCHISEE NAME | CORPORATE ID | FRANCHISEE ID | LOCATION | LOCATION CONDITION (DISTANCE) | LOCATION CONDITION (TIME) |
|---|---|---|---|---|---|---|
| 0001 | YAMADA SET MEALS | 101 | 5423 | SHINAGAWA WARD, TOKYO, ... | 300 m FROM xx STATION | ONE MINUTE'S WALK FROM xx STATION |
| | | | 9876 | MINATO WARD, TOKYO, ... | 1 Km FROM xx STATION | FIFTEEN MINUTE'S WALK FROM xx STATION |
| | | | ... | ... | ... | ... |
| | CACAO COFFEE SHOP | 102 | A PLURALITY OF FRANCHISEE IDS ARE REGISTERED | ... | ... | ... |
| | WHEAT NOODLES NAKAUMI | 103 | A PLURALITY OF FRANCHISEE IDS ARE REGISTERED | ... | ... | ... |
| | BIG STEAK | 104 | A PLURALITY OF FRANCHISEE IDS ARE REGISTERED | ... | ... | ... |
| 0002 | FRENCH YAMATE | 105 | | ... | ... | ... |
| | MANPUKU RAMEN | | | ... | ... | ... |
| ... | ... | | | ... | ... | ... |

FIG. 7A

| ELECTRONIC MONEY FUNCTIONAL SECTION ID | SHOP TERMINAL ID | FRANCHISEE ID | TRANSACTION DATE AND TIME | TRANSACTION TYPE | TRANSACTION AMOUNT | BALANCE |
|---|---|---|---|---|---|---|
| 1111 | 12345 | 4321 | 2008/07/01/HOURS, MINUTES, AND SECONDS | PAYMENT | 550YEN | 2450YEN |
| 1111 | 25874 | 9635 | 2008/07/03/HOURS, MINUTES, AND SECONDS | PAYMENT | 600YEN | 1850YEN |
| 1111 | 65432 | 7415 | 2008/07/15/HOURS, MINUTES, AND SECONDS | DEPOSIT | 2000YEN | 3850YEN |

FIG. 7B

| GUIDANCE SOURCE FRANCHISEE NAME | GUIDANCE SOURCE FRANCHISEE ID | GUIDANCE ID | GUIDANCE DESTINATION FRANCHISEE NAME | GUIDANCE DESTINATION FRANCHISEE ID | GUIDANCE CONTENTS | OUTPUT CONDITION | SPECIAL CONDITION ID |
|---|---|---|---|---|---|---|---|
| YAMADA SET MEALS | 6542 | 001 | CACAO COFFEE SHOP | A PLURALITY OF FRANCHISEE IDS ARE REGISTERED | PRINT COUPON INFORMATION "5% REBATE" | | NONE |
| | | 002 | WHEAT NOODLES NAKAUMI | A PLURALITY OF FRANCHISEE IDS ARE REGISTERED | PRINT SHOP INTRODUCING ADVERTISEMENT "WE HAVE REOPENING PRESENTS FOR YOU" | USE GUIDANCE SOURCE FRANCHISEE 10 TIMES OR MORE WITHIN 3 MONTHS OF MOST RECENT USE | 001 |
| | | 003 | BIG STEAK | A PLURALITY OF FRANCHISEE IDS ARE REGISTERED | ELECTRONIC MAIL ADVERTISEMENT "5% REBATE" | USE GUIDANCE SOURCE FRANCHISEE 10 TIMES OR MORE WITHIN 6 MONTHS OF MOST RECENT USE | 002 |

FIG. 8A

| SPECIAL CONDITION ID | AREA | WEATHER | GENDER | AGE | TIME |
|---|---|---|---|---|---|
| 001 | INTRODUCE SHOP WITHIN RADIUS OF 1 km OF LOCATION OF GUIDANCE SOURCE FRANCHISEE | NO CONDITION | MALE | 20'S TO 40'S | WEEKDAY 10 TO 12 O'CLOCK |
| 002 | INTRODUCE SHOP WITHIN RADIUS OF 3 km OF LOCATION OF GUIDANCE SOURCE FRANCHISEE | FAIR | FEMALE | 20'S TO 50'S | WEEKDAY 10 TO 17 O'CLOCK |
| 003 | INTRODUCE SHOP WITHIN 10 MINUTES' WALK FROM STATION NEAREST TO GUIDANCE SOURCE FRANCHISEE | RAIN | MALE, FEMALE | NONE | NONE |

FIG. 8B

| GUIDANCE ID | OUTPUT TIME | OUTPUT DESTINATION ELECTRONIC MONEY FUNCTIONAL SECTION ID | GUIDANCE CONTENTS | EXPIRATION DATE |
|---|---|---|---|---|
| 011 | 2008/08/01/ HOURS, MINUTES, AND SECONDS | 1111 | 10% REBATE ON PAYMENT MADE AT CACAO COFFEE SHOP | 2008/08/31 |
| ⋮ | ⋮ | ⋮ | ⋮ | ⋮ |
| ⋮ | ⋮ | ⋮ | ⋮ | ⋮ |

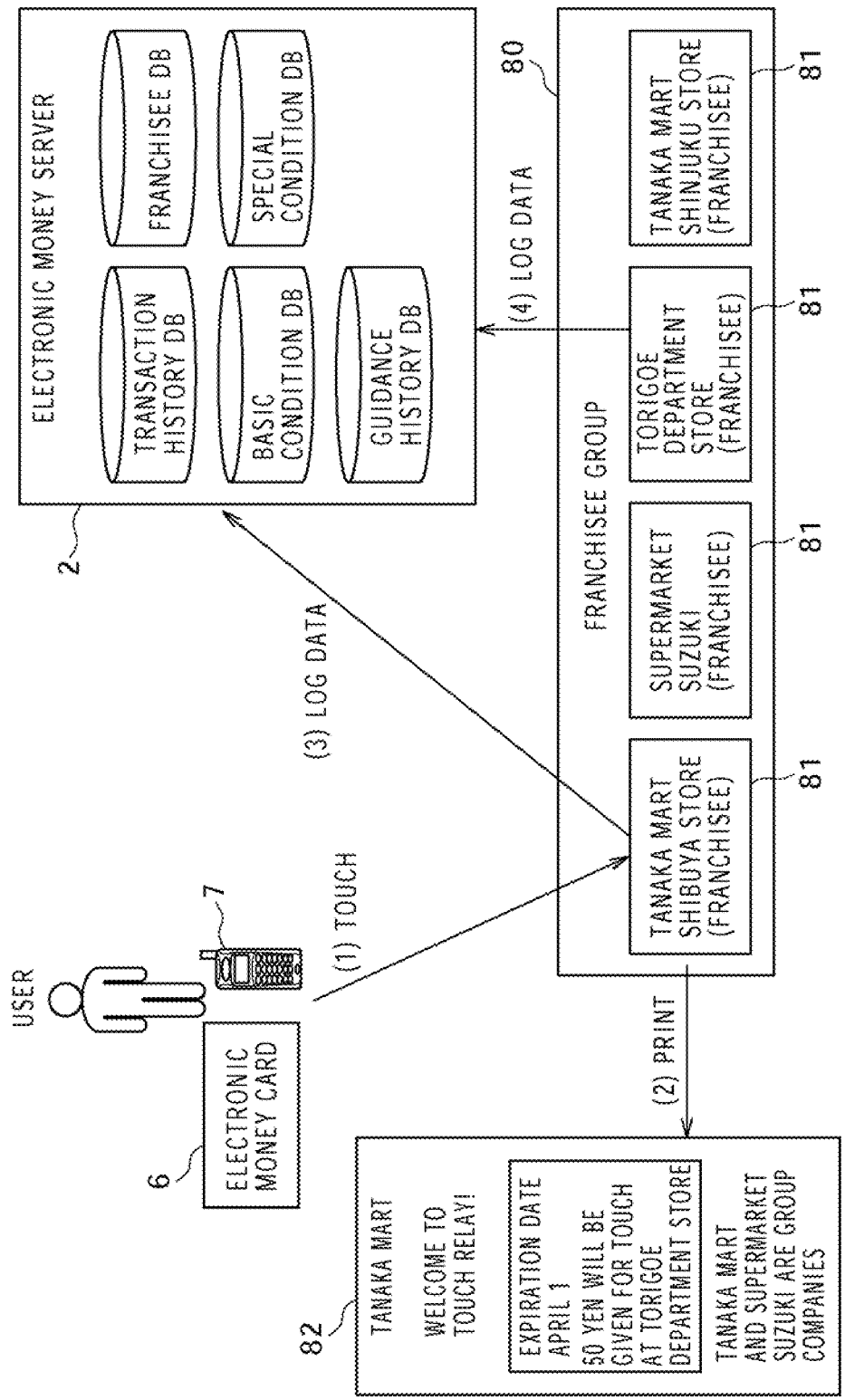

SHOP TERMINAL AND INFORMATION PROCESSING SERVER

CROSS REFERENCES TO RELATED APPLICATIONS

The present application claims priority to Japanese Priority Patent Application JP 2008-262377 filed in the Japan Patent Office on Oct. 9, 2008, the entire content of which is hereby incorporated by reference.

BACKGROUND

The present disclosure relates to a shop terminal and an information processing server, and particularly to a shop terminal and an information processing server for sending a user as a customer between shops within a group using an IC (integrated circuit) chip possessed by the user, for example.

There has recently been a case where companies cooperate with each other, or a plurality of companies are merged or acquired, for example, and thus shops of different strains have relationship in terms of management and form a group.

In addition, for example, when "XX Buckwheat Noodles Shop," which is a stand-up buckwheat noodles chain, and "XY Coffee Shop" as a coffee shop are merged with each other, a single company manages "XX Buckwheat Noodles Shop" and "XY Coffee Shop," and both shops form a group in terms of management.

When a plurality of shops thus form a group, the shops within the group may desire to send customers to each other.

When customers are sent within the group, each shop may issue a coupon of another shop. In this case, because a shop issuing a coupon and a shop where the coupon is used are different from each other, there is a problem of how to check customer sending effect.

Accordingly, there is "a coupon issuing system and a coupon issuing method" of the following Japanese Patent Laid-Open No. 2007-213281 as a technique for solving the problem.

When a coupon issuing entity and a business of a shop where a coupon is used are different from each other, this technique enables the coupon issuing entity to check customer sending effect by printing a two-dimensional bar code on the coupon and reading the two-dimensional bar code by a bar code reader of the shop.

On the other hand, an electronic money system that makes commercial transactions by electronic information processing has recently been introduced into an increasing number of shops.

Commercial transactions by electronic money are made by moving value by operating electronic data having an exchange value equivalent to money, which electronic data is referred to as "value."

The value is electronic data indicating an amount of money, and is written in an IC chip as amount information.

This IC chip is for example included in a portable telephone, a card made of resin, or the like, and is carried by a user as an electronic wallet.

The amount of value stored by the IC chip can be increased or decreased by accessing the IC chip from a shop terminal installed in a payment area of a shop, and a payment can be made by decreasing the amount of the value.

There are cases where shops of companies forming a group use an electronic money system. Accordingly, when there is a method for sending customers to another shop using an electronic money system and checking customer sending effect, an existing electronic money system can be used as a customer sending system that enables the checking of customer sending effect, and the customer sending system can be constructed inexpensively. Thus, such a method has been sought.

It is accordingly desirable to send customers to another shop and check the customer sending effect.

SUMMARY

According to an embodiment, there is provided an information processing device including: ID (identification) information obtaining means for obtaining ID information from an IC chip; guidance information outputting means for outputting guidance information of a shop for the obtained ID information; and guidance completion information transmitting means for transmitting guidance completion information including the obtained ID information and information identifying the shop to a server.

The information processing device further includes guidance information storing means for storing guidance information corresponding to ID information, wherein the guidance information outputting means obtains the guidance information for the obtained ID information from the guidance information storing means, and outputs the guidance information.

The information processing device further includes ID information transmitting means for transmitting the obtained ID information to the server, wherein the guidance information outputting means obtains the guidance information for the transmitted ID information from the server, and outputs the guidance information.

The information processing device further includes monetary value changing means for outputting monetary value changing information to the IC chip having storing means for rewritably storing monetary value information indicating monetary value, and makes the monetary value information stored by the storing means of the IC chip changed, wherein when the monetary value information is changed by the monetary value changing means, the ID information obtaining means obtains the ID information to identify the IC chip.

According to an embodiment, there is provided an information processing server including: ID information receiving means for receiving ID information from an information processing device, the information processing device being installed in a shop and obtaining the ID information from an IC chip; guidance completion information receiving means for receiving guidance completion information from an information processing device installed in a shop as a guidance source, the guidance completion information including ID information obtained by the information processing device and guidance destination shop identifying information identifying a shop as a guidance destination, guidance to the guidance destination having been given by the information processing device, for the ID information; and comparing means for comparing the guidance completion information received from the information processing device of the shop as the guidance source with ID information received from the information processing device of the shop as the guidance destination.

The information processing server further includes: group information storing means for storing group information about a group to which the shops belong; group guidance information storing means for storing group guidance information associating ID information with guidance information of the shops belonging to the group; and group guidance information transmitting means for transmitting, to an information processing device installed in one shop, guidance information of a shop other than the shop on a basis of the group guidance information.

When the ID information receiving means receives, from one information processing device, ID information obtained by the information processing device, the group guidance information transmitting means transmits the group guidance information to the information processing device.

The information processing server further includes: monetary value changing information generating means for generating monetary value changing information for changing the monetary value information stored by the IC chip from an information processing device that received the group guidance information from the group guidance information transmitting means on a basis of a result of comparison by the comparing means; and monetary value changing information transmitting means for transmitting the generated monetary value changing information to the information processing device.

According to the embodiments, it is possible to check customer sending effect by providing guidance information for guidance to another shop to a user when electronic money is used and comparing a transaction log of transactions by electronic money with the guidance information provided to the user.

Additional features and advantages are described herein, and will be apparent from the following Detailed Description and the figures.

BRIEF DESCRIPTION OF THE FIGURES

FIG. 6 is a diagram showing an example of logical configuration of a franchisee DB;

FIGS. 7A and 7B are diagrams showing an example of logical configuration of a transaction history DB and a basic condition DB;

FIGS. 8A and 8B are diagrams showing an example of logical configuration of a special condition DB and a guidance history DB;

FIG. 15 is a diagram of assistance in explaining an example of modification of the embodiment.

DETAILED DESCRIPTION (A) Outline of Embodiment

Figure 1:
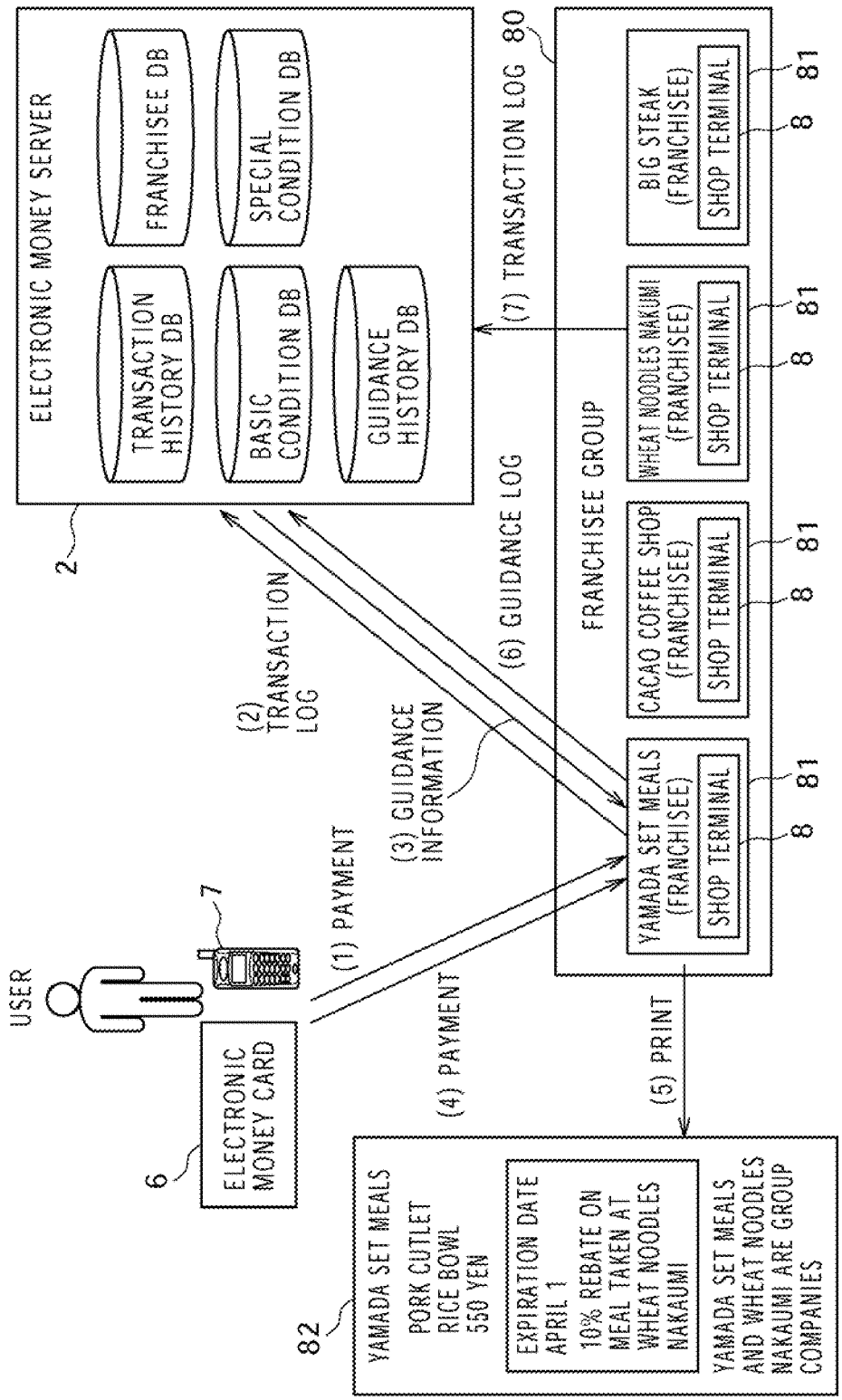
FIG. 1 is a diagram of assistance in explaining a general constitution according to a present embodiment.

An outline of an embodiment will be described below so as to correspond to numbers shown in parentheses in FIG. 1.

(1) A user makes a payment at "Yamada Set Meals," which is a franchisee 81, using an electronic money function of a portable telephone 7 (or an electronic money card 6).

(2) A shop terminal 8 of "Yamada Set Meals" transmits a transaction log of transactions with the portable telephone 7 to an electronic money server 2. The user has used "Yamada Set Meals" a plurality of times. The electronic money server 2 analyzes the transaction log, and recognizes that the user is a customer who frequently visits "Yamada Set Meals."

(3) Accordingly, the electronic money server 2 transmits guidance information for guidance to another shop (suppose that the shop is "Wheat Noodles Nakaumi") to the shop terminal 8 of "Yamada Set Meals" to guide the user to "Wheat Noodles Nakaumi" when the user comes to "Yamada Set Meals" to have a meal next time.

The franchisee 81 to which to guide the user is selected by for example comparing a history of transactions of the user with a basic condition DB and a special condition DB to be described later and retrieving guidance information matching the conditions.

(4) The user thereafter visits "Yamada Set Meals," has a meal, and makes a payment by the value of the portable telephone 7.

(5) At this time, the shop terminal 8 recognizes that the user is an object of guidance from a communication with the portable telephone 7, and prints the guidance information for guidance to "Wheat Noodles Nakaumi," which information has been downloaded from the electronic money server 2, on a receipt 82.

(6) After the output of the receipt 82, the shop terminal 8 notifies a guidance log in which information to the effect that the guidance information for guidance to "Wheat Noodles Nakaumi" has been output to the user to the electronic money server 2.

(7) When the user visits "Wheat Noodles Nakaumi" according to the guidance information, has a meal, and makes a payment by the portable telephone 7, a shop terminal 8 of "Wheat Noodles Nakaumi" transmits a transaction log to the electronic money server 2.

The electronic money server 2 can confirm that the user has been sent as a customer to "Wheat Noodles Nakaumi" according to the guidance by the guidance log from the shop terminal 8 of "Yamada Set Meals" and the transaction log from "Wheat Noodles Nakaumi."

(B) Details of Embodiment

FIG. 1 is a diagram of assistance in explaining a flow of general information processing according to the embodiment.

Franchisees 81, 81, . . . (hereinafter franchisees 81) are franchisees of electronic money service provided by the electronic money server 2, and form a franchisee group 80 that send customers to each other.

The franchisees 81 are formed by different strains of shops such as "Yamada Set Meals" (set meal restaurant), "Cacao Coffee Shop" (coffee shop), "Wheat Noodles Nakaumi" (wheat noodles restaurant), and "Big Steak" (steakhouse), for example.

Incidentally, the franchisees 81 may be shops of a same strain such as "Wheat Noodles Nakaumi Shinjuku Shop," "Wheat Noodles Nakaumi Shibuya Shop," and the like.

A procedure for sending a user as a customer will be described in the following according to numbers shown in parentheses.

(1) The user has a portable telephone 7 with an electronic money function (the portable telephone 7 may be an electronic money card 6). The portable telephone 7 includes an IC chip having a function of making a payment by value.

The value in this case is a concept corresponding to money in an electronic money system. A process of increasing the value is referred to as a charge. A process of decreasing the value is referred to as a payment.

When the user has a meal at "Yamada Set Meals" and requests a payment by the portable telephone 7, the user sets the portable telephone 7 on a shop terminal 8 of "Yamada Set Meals."

Then, when a person in charge at "Yamada Set Meals" operates the shop terminal 8, the shop terminal 8 communicates with the IC chip of the portable telephone 7 to make the IC chip decrease the value by the amount of a bill and thereby make a payment.

(2) The shop terminal 8 installed in "Yamada Set Meals" generates a transaction log, which is log data in which a transaction with the portable telephone 7 is recorded, and stores the transaction log in a built-in storage medium.

The shop terminal 8 then transmits the log data stored on the storage medium en bloc to the electronic money server 2 by batch processing after closing of the shop terminal 8, for example.

Receiving the transaction log from the shop terminal 8, the electronic money server 2 stores contents recorded in the transaction log in a transaction history DB. DB in this case denotes a database.

The transaction history DB stores a date and time, the franchisee 81, the shop terminal 8, the amount of the payment and the like when the user made the payment.

(3) The electronic money server 2 compares the payment record of the user which record is recorded in the transaction history DB with a basic condition DB and a special condition DB at regular intervals or irregular intervals.

The basic condition DB and the special condition DB store guidance information to be provided to the user and conditions to be satisfied by purchasing activities of the user or the like to provide the guidance information.

More specifically, as in "Guide the user to Wheat Noodles Nakaumi when the user has used Yamada Set Meals ten times or more within three months," for example, the basic condition DB stores a guidance destination (guidance to "Wheat Noodles Nakaumi") and a condition for outputting guidance information (using "Yamada Set Meals" ten times or more within three months). The special condition DB stores a more detailed condition such for example as "Guide to a franchisee within 10 km of Yamada Set Meals."

The electronic money server 2 thus checks whether the transaction history of the user includes a content matching the outputting condition. When there is a content matching the outputting condition, the electronic money server 2 transmits the guidance information associated with the outputting condition to the shop terminal 8 of the franchisee 81 ("Yamada Set Meals" in this case) as a transmission source of the matching transaction log so that the guidance information can be provided when the user makes a payment at "Yamada Set Meals" next time.

An electronic money functional section ID, which is ID information possessed by the IC chip of the portable telephone 7 of the user, is associated with the guidance information, and guidance to the franchisee 81 as guidance destination (assumed to be "Wheat Noodles Nakaumi") is recorded in the guidance information.

(4) When the shop terminal 8 of "Yamada Set Meals" receives the guidance information from the electronic money server 2, the shop terminal 8 stores the guidance information, and waits for the user to visit "Yamada Set Meals" again and make a payment.

Then, when the user visits "Yamada Set Meals," has a meal, and requests a payment by the portable telephone 7, the user sets the portable telephone 7 on the shop terminal 8 of "Yamada Set Meals."

When a person in charge at "Yamada Set Meals" operates the shop terminal 8, the shop terminal 8 communicates with the IC chip of the portable telephone 7 to make the IC chip decrease the value by the amount of a bill and thereby make a payment.

(5) When communicating with the IC chip to perform the payment process, the shop terminal 8 of "Yamada Set Meals" reads the electronic money functional section ID from the IC chip. In addition to performing the payment process, the shop terminal 8 searches for guidance information downloaded from the electronic money server 2 using the electronic money functional section ID. When there is corresponding guidance information, the shop terminal 8 prints the guidance information on a receipt 82.

The guidance information for sending the user as a customer to "Wheat Noodles Nakaumi," such as "Expiration Date April 1, a 10% rebate on meal taken at Wheat Noodles Nakaumi," for example, is printed on the receipt 82.

The guidance information is printed on the receipt 82 as a method of presenting the guidance information in this case because the receipt 82 is usually printed at a time of payment and it suffices for the user only to read the guidance information printed on the receipt 82, which is easy, simple, and not troublesome.

In addition, "Yamada Set Meals and Wheat Noodles Nakaumi are group companies" or the like is printed on the receipt 82, so as to be able to make it known to the user that the group companies belong to the same chain when the user may not be fully aware that the group companies belong to the same chain because of different brand names of the shops.

(6) Then, the shop terminal 8 generates a guidance log in which information to the effect that the guidance information is output to the user is recorded, stores the guidance log in a built-in storage medium, and transmits the guidance log to the electronic money server 2 after closing of the shop terminal 8, for example.

Receiving the guidance log from the shop terminal 8, the electronic money server 2 stores the guidance log in a guidance history DB.

(7) After seeing the guidance information on the receipt 82, the user visits "Wheat Noodles Nakaumi" within the expiration date, has a meal, and makes a payment by the electronic money of the portable telephone 7.

A shop terminal 8 of "Wheat Noodles Nakaumi" thereafter transmits a transaction log in which information on the payment with the portable telephone 7 is recorded to the electronic money server 2 by batch processing.

Receiving the transaction log, the electronic money server 2 stores the transaction log in the transaction history DB.

The electronic money server 2 compares the transaction history DB and the guidance history DB with each other about once a day, for example, to check whether each user made a payment according to guidance information.

For example, the electronic money server 2 confirms that the user has been sent as a customer to "Wheat Noodles Nakaumi" by the guidance information by confirming by the guidance history DB that the guidance information for guidance to "Wheat Noodles Nakaumi" has been provided to the user and confirming by the transaction log from "Wheat Noodles Nakaumi" that the user made a payment corresponding to the guidance information at "Wheat Noodles Nakaumi" within the expiration date.

Then, confirming that the user followed the guidance information, in order to give a bonus (for example a return of 10% of the bill) described in the guidance information, the electronic money server 2 generates amount changing information for charging the value by the amount of the bonus, transmits the amount changing information to the portable telephone 7, and increases the amount of the value stored in the portable telephone 7 by the amount of the bonus.

A value thus presented to a user will be referred to as a value gift.

A value gift is provided as follows, for example.

First, the electronic money server 2 transmits an electronic mail stating that a value gift can be provided to the portable telephone 7.

Then, the user reads the electronic mail, and accesses a Web site managed by the electronic money server 2 by the portable telephone 7.

Accepting the access from the portable telephone 7 to the Web site, the electronic money server 2 transmits amount changing information from the Web site to the portable telephone 7.

The portable telephone 7 receives the amount changing information, and executes the amount changing information to perform value charging.

A bonus is provided to the user in the form of a value gift in the above-described case. In addition to this, when the bonus is a giveaway, the bonus is handled individually.

Thus, in the present embodiment, the guidance information can be provided to the user using the use of electronic money, and a customer sending effect of the guidance information can be checked from the transaction log and the like.

In addition, because the guidance information is printed on the receipt 82, the user can easily recognize the guidance information.

Further, a customer sending effect is automatically achieved by electronic data such as the transaction log and the like. Therefore the convenience of use of the guidance information can be enhanced without the user being desired to bring the receipt 82 to the franchisee 81 as guidance destination.

Incidentally, in the present embodiment, when the user has used one franchisee 81 a plurality of times, the user is guided to another franchisee 81. However, it is also possible to guide the user to another franchisee 81 when the user visits one franchisee 81 for the first time.

In this case, a shop terminal 8 of one franchisee 81 provides guidance information for guidance to another shop to an unspecified user each time a payment is made by the portable telephone 7 or the electronic money card 6, and transmits a guidance log in which the electronic money functional section ID of the user to whom the guidance information is provided and guidance contents are recorded to the electronic money server 2.

The electronic money server 2 can check whether the unspecified user made a payment at the other franchisee 81 according to the guidance information by comparing a guidance history with a transaction history of the franchisee 81 as guidance destination.

Figure 2:
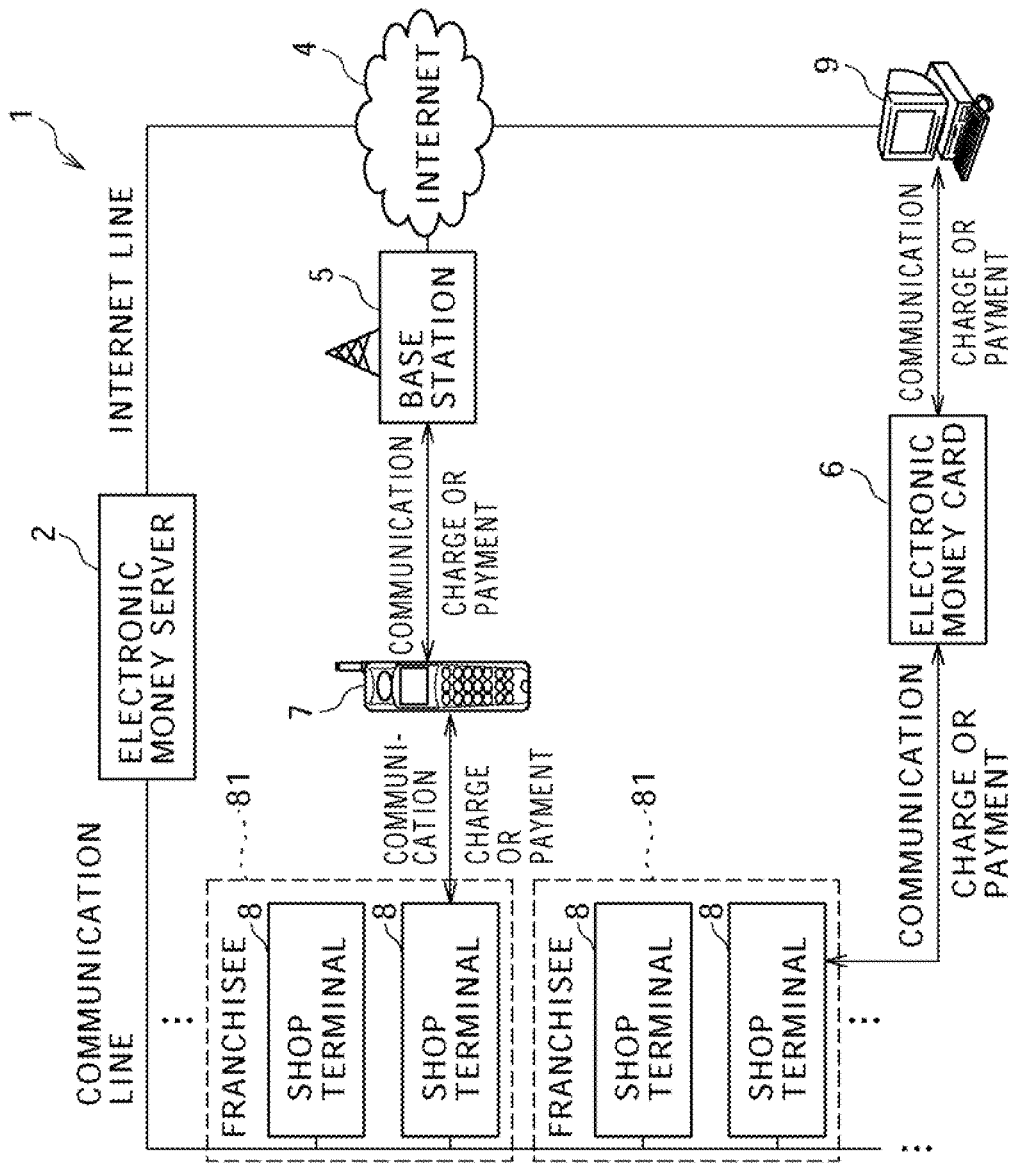
FIG. 2 is a diagram showing a network configuration of an electronic money system.

FIG. 2 is a diagram showing a network configuration of an electronic money system 1.

The electronic money system 1 includes the portable telephone 7, the electronic money server 2, the Internet 4, a base station 5, the electronic money card 6, a user terminal 9, shop terminals 8 installed in franchisees 81, and the like.

The portable telephone 7 includes a noncontact type IC chip having an electronic money processing function. This IC chip has a function of storing an electronic money functional section ID, which is ID information given to the electronic money processing function, a function of storing value, a function of increasing or decreasing the amount of the stored value using amount changing information, and the like.

The IC chip can perform short-range radio communication with a shop terminal 8 when the portable telephone 7 is brought into proximity to the reader/writer of the shop terminal 8. Then, by transmitting and inputting amount changing information from the shop terminal 8 to the IC chip, the IC chip can be made to perform a charge or make a payment.

In addition, the portable telephone 7 can be connected to the Internet 4 by performing radio communication with the base station 5, and access a Web site of the electronic money server 2.

The portable telephone 7 then receives amount changing information generated by the electronic money server 2 from the Web site of the electronic money server 2, and inputs the amount changing information to the IC chip, so that the value stored in the IC chip can be increased or decreased.

When the bonus of guidance information is a rebate, the electronic money server 2 has the portable telephone 7 access the Web site, and transmits amount changing information from the Web site to the IC chip within the portable telephone 7, whereby the IC chip is charged with the amount of the rebate.

The electronic money card 6 is an IC card including an IC chip equivalent to the IC chip included in the portable telephone 7.

The electronic money card 6 can not only communicate with a shop terminal 8 to perform a charge or make a payment as with the IC chip of the portable telephone 7, but also be connected to the electronic money server 2 via the user terminal 9 and communicate with the electronic money server 2 to perform a charge or make a payment.

When a rebate is made on the electronic money card 6, the electronic money card 6 is connected to the electronic money server 2 via the user terminal 9, and has the electronic money server 2 transmit amount changing information.

Thus, in the present embodiment, payment can be made by the IC chips included in the portable telephone 7 and the electronic money card 6. The media including these IC chips will hereinafter be referred to collectively as an electronic money medium.

The electronic money medium can be not only cards and portable telephones but also other media such for example as PDAs (Personal Digital Assistants).

The user terminal 9 is for example a personal computer having a device for accessing a noncontact type IC chip, which device is referred to as a reader/writer. The user terminal 9 has a function of being connected to the Internet 4.

The user terminal 9 can be connected to the IC chip of the electronic money medium by the reader/writer, and mediate communication between the IC chip and the electronic money server 2.

The electronic money server 2 collects transaction logs (log data in which a history of charges and payments is recorded) from the shop terminal 8, performs summation, and manages correspondence between the distribution of value and money.

In addition, the electronic money server 2 provides guidance information to users, checks customer sending effect of the guidance information, and gives a bonus by a value gift to users who followed the guidance information, for example.

Franchisees 81 are shops where payment can be made by the value stored in the IC chip of the electronic money medium (convenience stores, department stores, restaurants, other retail shops, business vehicles and other mobile objects, and the like). A franchisee 81 has a single shop terminal 8 or a plurality of shop terminals 8 in a payment area.

As described above, some of these franchisees 81 form a franchisee group in which the franchisees 81 send customers to each other.

Shop terminals 8 perform short-range radio communication with the IC chip of the electronic money medium via a reader/writer. The shop terminals 8 can input amount changing information to the IC chip to perform a charge or make a payment.

The shop terminals 8 record contents of processing with the IC chip in a transaction log, and transmit the transaction log to the electronic money server 2 by batch processing about once a day, for example.

In addition, the shop terminals 8 download guidance information from the electronic money server 2, store the guidance information, and print the guidance information on a receipt 82 of a user to be guided. Then, the shop terminals 8 store a guidance log of the guidance, and transmit the guidance log to the electronic money server 2 by batch processing about once a day, for example.

Figure 3:
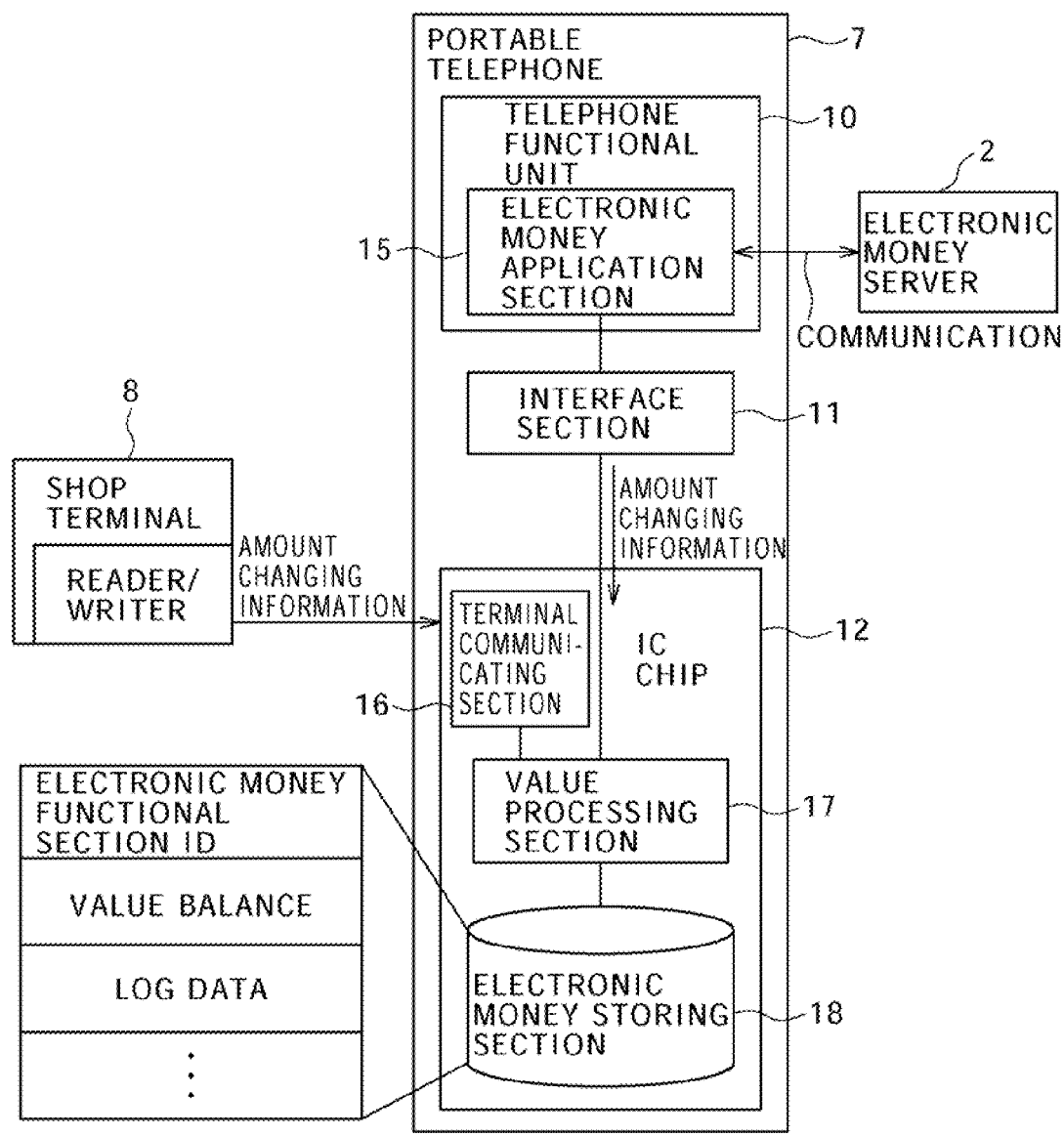
FIG. 3 is a conceptual diagram showing an example of configuration of a portable telephone.

FIG. 3 is a conceptual diagram showing an example of configuration of the portable telephone 7.

The portable telephone 7 has a telephone functional unit 10 and an IC chip 12 functioning as an electronic money functional section. The telephone functional unit 10 and the IC chip 12 are connected to each other by an interface section 11.

The IC chip 12 is a computer including a CPU (Central Processing Unit), a ROM (Read Only Memory), a RAM (Random Access Memory) and the like. A terminal communicating section 16, a value processing section 17, an electronic money storing section 18 and the like are formed by combining these pieces of hardware and software.

The electronic money storing section 18 stores an electronic money functional section ID, a value balance, log data and the like.

The electronic money functional section ID is identifying information for identifying the IC chip 12 in the electronic money system 1.

The value balance is the amount of currently stored value. A payment can be made by decreasing the amount. The electronic money storing section 18 thus functions as amount storing means for storing an amount of monetary value as electronic data (value).

The log data has information on processing of the value and the like recorded therein.

The terminal communicating section 16 is a functional section configured to perform radio communication with the reader/writer of a shop terminal 8. The terminal communicating section 16 mediates communication between the shop terminal 8 and the value processing section 17.

The value processing section 17 is a functional section configured to execute various commands such as amount changing information and the like. The value processing section 17 can communicate with a shop terminal 8 via the terminal communicating section 16, and can communicate with the electronic money server 2 via the telephone functional unit 10.

The commands include amount changing information, an ID reference command and the like. The shop terminal 8 and the electronic money server 2 transmit amount changing information to the value processing section 17 to perform a charge or make a payment, and transmit an ID reference command to read the electronic money functional section ID in the electronic money storing section 18.

The amount changing information functions as adding information for adding to the value stored in the electronic money storing section 18 when a charge is performed, and functions as subtracting information when a payment is made.

Thus, the value processing section 17 functions as amount changing means, and the IC chip 12 has an electronic money function of storing the amount of monetary value and changing the stored amount of the monetary value using amount changing information input from a shop terminal.

The telephone functional unit 10 has a call mode for making a call and an application mode for operating an application. The telephone functional unit 10 can be changed between the call mode and the application mode by an operation of a user.

The telephone functional unit 10 has a CPU and a storing section configured to store various application programs. The telephone functional unit 10 can exert various application functions by executing these application programs by the CPU in the application mode.

In the example of FIG. 3, an electronic money application section 15 for being connected to the Web site of the electronic money server 2 and receiving a value gift, for example, is installed.

The above description has been made of the portable telephone 7. However, the electronic money card 6 includes an IC chip similar to the IC chip 12.

Figure 4:
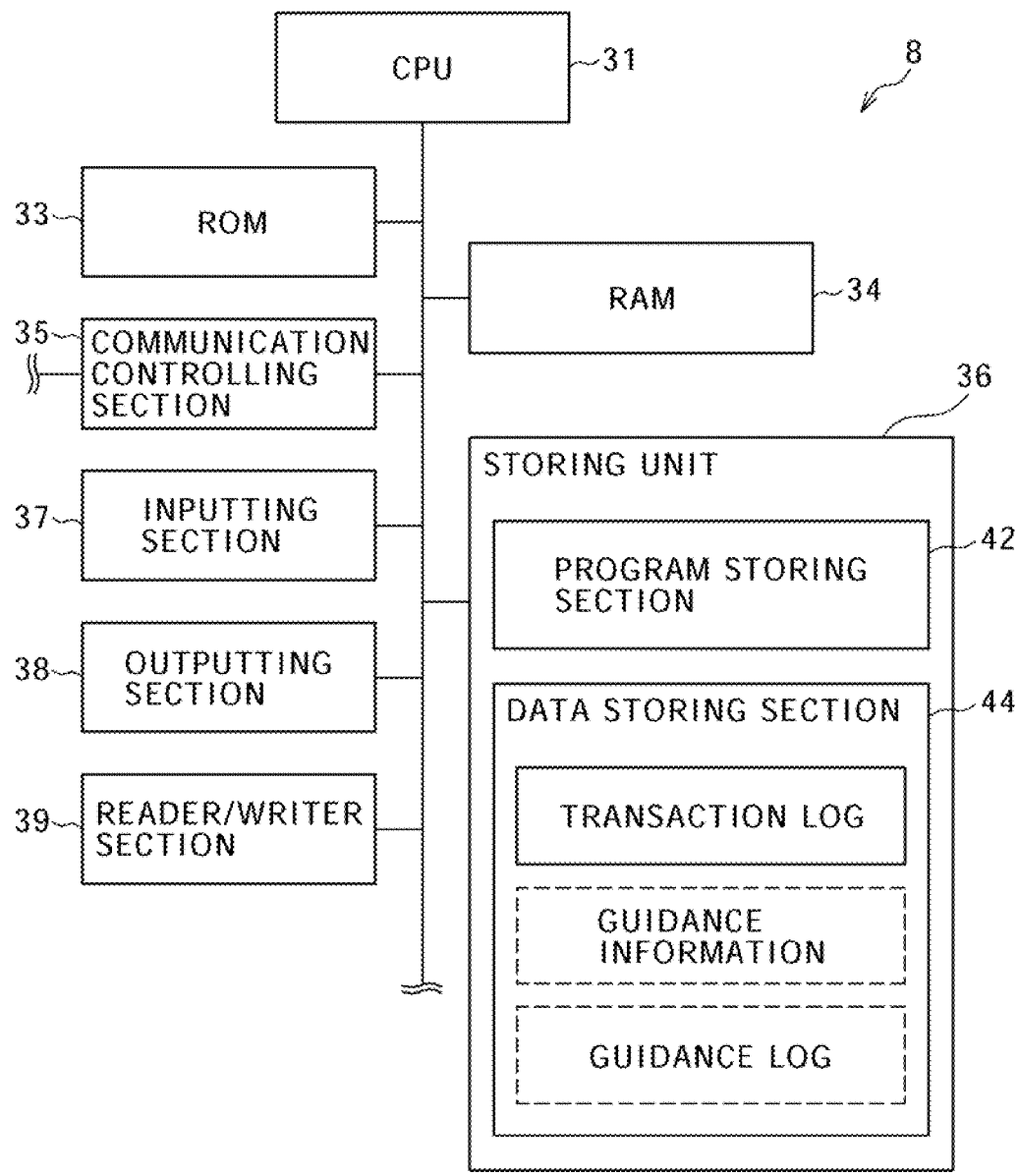
FIG. 4 is a diagram showing an example of hardware configuration of a shop terminal.

FIG. 4 is a diagram showing an example of hardware configuration of the shop terminal 8.

The shop terminal 8 is formed by connecting a CPU 31, a ROM 33, a RAM 34, a communication controlling section 35, a storing unit 36, an inputting section 37, an outputting section 38, a reader/writer section 39 and the like by a bus line.

The CPU 31 performs information processing according to a predetermined program, and controls the whole of the shop terminal 8, for example.

In the present embodiment, the CPU 31 inputs amount changing information to the IC chips 12 of electronic money media to increase or decrease the value stored by the IC chips 12, creates a transaction log in which contents of performed amount changing processing are recorded and transmits the transaction log to the electronic money server 2 by batch processing, prints guidance information corresponding to the electronic money functional section ID of an IC chip 12 on a receipt 82, and creates a guidance log and transmits the guidance log to the electronic money server 2.

The ROM 33 is a read only memory storing a basic program, a parameter and the like for operating the shop terminal 8.

The RAM 34 is a memory writable and readable at any time which memory provides a working memory for the CPU 31, and loads and stores a program and data stored in the storing unit 36, for example.

The communication controlling section 35 connects the shop terminal 8 to the electronic money server 2 via a network.

The inputting section 37 has for example an inputting device such as a keyboard, a bar code reader and the like. The inputting section 37 allows a person in charge of operation to input a product code, an amount of payment, a charge amount and the like, and perform a process between the shop terminal 8 and the electronic money medium.

The outputting section 38 is for example connected to a liquid crystal display device, a printer, an audio outputting device and the like. The outputting section 38 prints a receipt 82 on the printer, and presents information to a user or a person in charge of operation at the franchisee 81.

The reader/writer section 39 has a reader/writer including an antenna. The reader/writer section 39 performs radio communication with the IC chip 12 of the electronic money medium.

The reader/writer is placed in the vicinity of a cash register. A user can bring the electronic money medium into proximity to the reader/writer at a time of payment for a product. A user generally places the electronic money medium on an antenna surface of the reader/writer.

The storing unit 36 includes for example a hard disk and other storage media and a driving device for driving these media. The storing unit 36 includes a program storing section 42 for storing various programs, a data storing section 44 for storing data, and the like.

The program storing section 42 stores for example an OS, which is a basic program for making the shop terminal 8 function, and a program for having an amount changing process performed by inputting amount changing information to the IC chip 12 of the electronic money medium, for example.

The data storing section 44 stores not only basic information such as a terminal ID, which is ID information of the shop terminal 8, and a franchisee ID, which is ID information of the franchisee 81 in which the shop terminal 8 is installed, but also a transaction log, guidance information, a guidance log and the like.

Information such as the electronic money functional section ID of an IC chip 12 that performed an amount changing process, information for distinguishing payments from charges, an amount of payment or charge, a date and time when the amount changing process was performed, the franchisee ID, the terminal ID and the like is recorded in the transaction log. The transaction log is transmitted to the electronic money server 2 by batch processing.

The guidance information is transmitted by the electronic money server 2 and stored in the data storing section 44. The electronic money functional section ID of the electronic money medium possessed by a user to be guided, printing contents (guidance contents) to be printed on a receipt 82 when a payment process is performed for the electronic money functional section ID, and the like are recorded in the guidance information.

The guidance log is a history of output of guidance information. An electronic money functional section ID given to the IC chip 12 of an electronic money medium to which guidance information was output, contents of the guidance information, and the like are recorded in the guidance log.

Figure 5:
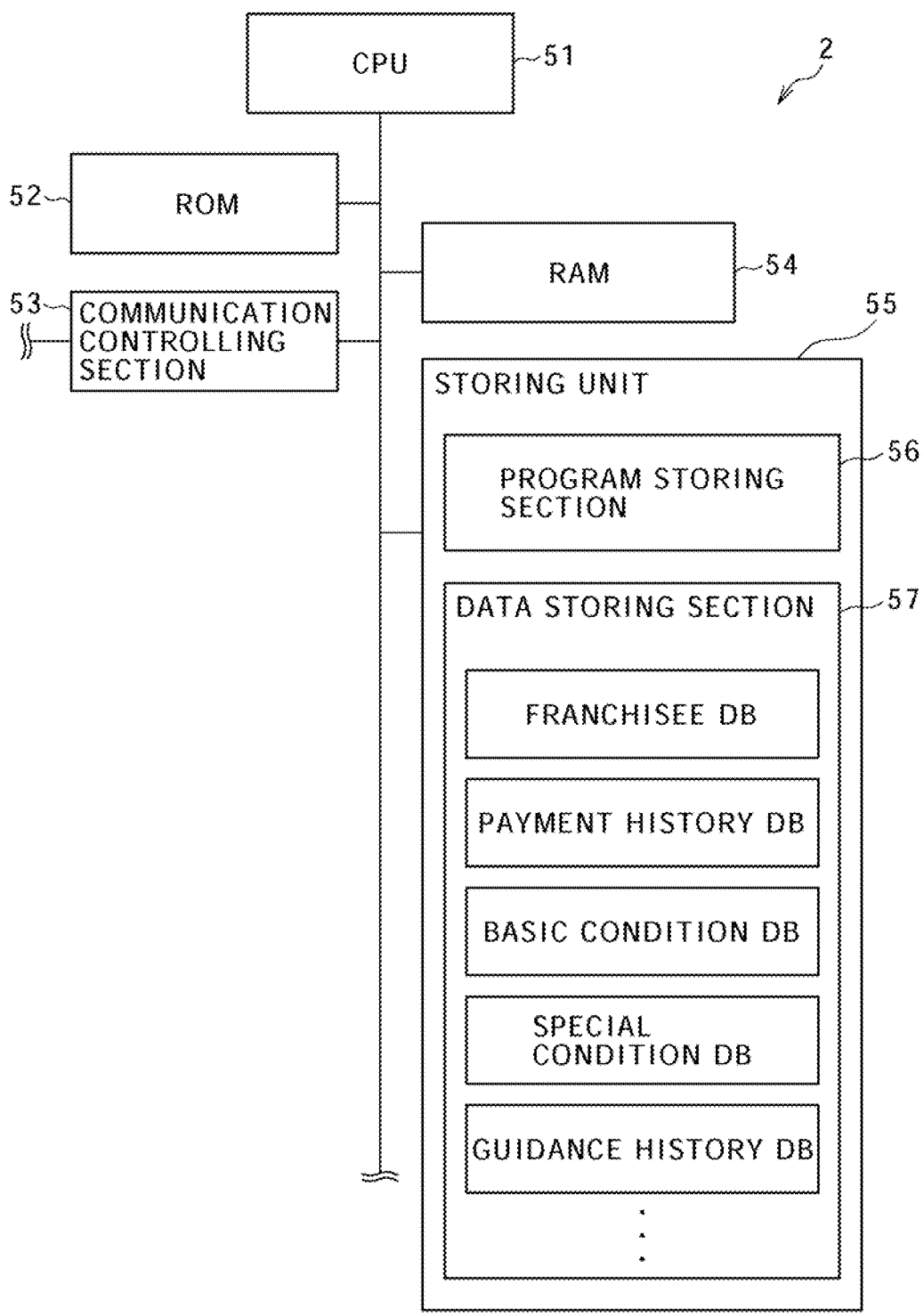
FIG. 5 is a diagram showing an example of hardware configuration of an electronic money server.

FIG. 5 is a diagram showing an example of hardware configuration of the electronic money server 2.

The electronic money server 2 is formed by connecting a CPU 51, a ROM 52, a RAM 54, a communication controlling section 53, a storing unit 55 and the like by a bus line. The electronic money server 2 forms an information processing server.

The CPU 51 is a central processing device for performing various information processing according to predetermined programs.

In the embodiment, the CPU 51 not only collects transaction logs from shop terminals 8 and performs summation but also transmits guidance information to shop terminals 8 and checks customer sending effect of the guidance information.

Incidentally, it is not necessary to perform all of these functions on the CPU 51. A system having equivalent functions to those of the electronic money server 2 may be formed by combining a plurality of server devices.

The ROM 52 is a read only memory. The ROM 52 stores a basic program, a parameter and the like for operating the electronic money server 2.

The RAM 54 is a readable and writable memory. The RAM 54 provides a working memory for the CPU 51, and loads and stores a program and data stored in the storing unit 55, for example.

The communication controlling section 53 communicates with a shop terminal 8, communicates with the portable telephone 7 via the Internet 4 and the base station 5, or communicates with the electronic money card 6 via the user terminal 9.

The storing unit 55 is formed by using a high-capacity storage device such as a hard disk, for example. The storing unit 55 includes a program storing section 56 for storing various programs, a data storing section 57 for storing data, and the like.

The program storing section 56 stores an OS, which is a basic program for making the electronic money server 2 function, a program for making the CPU 51 exert a function of processing transaction logs, a function of managing and distributing guidance information, a function of checking customer sending effect of the guidance information, and the like, and other programs.

The data storing section 57 stores a franchisee DB in which franchisees 81 are registered, a transaction history DB in which a history of transactions by the electronic money medium of each user is recorded, a basic condition DB specifying guidance information to be provided to users, a special condition DB, a guidance history DB in which guidance logs transmitted from shop terminals 8 are accumulated, and the like.

Though not shown, in addition to the above DBs, there are a user DB in which users are registered, a value gift information DB storing value gift information to be described later, and the like.

Configurations of these databases will be described in the following.

FIG. 6 is a diagram showing an example of logical configuration of the franchisee DB.

The franchisee DB is a database in which basic information of the franchisees 81 is recorded. The franchisee DB includes a "group ID," a "franchisee name," a "corporate ID," a "franchisee ID," a "location," a "location condition (distance)," a "location condition (time)," and other items.

The item "group ID" is ID information for identifying a franchisee group of businesses that send customers between the franchisees 81 through guidance information.

For example, in the example of FIG. 6, "Yamada Set Meals," "Cacao Coffee Shop," "Wheat Noodles Nakaumi," and "Big Steak" form a group. The group is given "0001" as a group ID. These franchisees 81 send customers to each other using guidance information.

"French Yamate" and "Manpuku Ramen" form another franchisee group. This franchisee group is given "0002" as a group ID.

The electronic money server 2 thus has group storing means for grouping and storing shops in which shop terminals 8 are installed.

The item "franchisee name" is the shop names of the franchisees 81.

The item "corporate ID" is ID information given to a business operating franchisees 81.

For example, even when "Yamada Set Meals" has a plurality of franchisees 81 such as Setagaya 3-Chome Shop, Nagatacho Station Shop, . . . , one business operates these franchisees 81. Therefore a corporate ID common to these franchisees 81 is given.

In the example of FIG. 6, different businesses operate the franchisees 81 of the franchisee group with the group ID "0001," and therefore different corporate IDs are given to different franchisee names. However, a same business operates "French Yamate" and "Manpuku Ramen" in the franchisee group with the group ID "0002," and therefore a same corporate ID "105" is given.

Thus, the electronic money system 1 may send customers to different franchisees 81 operated by the same business.

In addition, the electronic money system 1 may send customers to franchisees 81 of the same chain, such for example as sending customers from the Setagaya 3-Chome branch shop to the Nagatacho Station branch shop of "Yamada Set Meals."

The item "franchisee ID" is ID information given to each franchisee 81. For example, when "Yamada Set Meals" has a plurality of franchisees 81 such as Setagaya 3-Chome Shop, Nagatacho Station Shop, . . . , a franchisee ID is given to each of these shops.

The item "location" is the address of the location of a franchisee 81.

The item "location condition (distance)" is a distance in a straight line between a point where a franchisee 81 is located and a reference point. The reference point is set for each franchisee 81, and a nearest station is generally used as the reference point.

The item "location condition (time)" is a time taken to walk from a reference point to a franchisee 81. The reference point is set for each franchisee 81, and a nearest station is generally used as the reference point.

These location conditions are used to narrow down franchisees 81 using a distance or a time, for example.

FIG. 7A is a diagram showing an example of logical configuration of the transaction history DB.

Contents of transaction logs transmitted from shop terminals 8 are recorded in the transaction history DB. The transaction history DB includes an "electronic money functional section ID," a "shop terminal ID," a "franchisee ID," a "transaction date and time," a "transaction type," a "transaction amount," a "balance," and other items.

The item "electronic money functional section ID" is the electronic money functional section ID of an IC chip 12 used by a user to perform a charge or make a payment.

This electronic money functional section ID identifies the electronic money medium used by the user.

The item "shop terminal ID" is the shop terminal ID of the shop terminal 8 where the user made the payment or performed the charge.

The item "franchisee ID" is the franchisee ID of a franchisee 81 in which the shop terminal 8 where the user made the payment or performed the charge is installed.

There is a case where a franchisee 81 has a plurality of shop terminals 8 installed in a payment area. Even in such a case, the franchisee 81 used by a user can be identified by the "franchisee ID," and further a shop terminal 8 where the user made a payment or performed a charge can be identified by the "shop terminal ID."

The item "transaction date and time" is a date, hours, minutes, and seconds when the user made the payment or performed the charge.

The item "transaction type" is a recording of a distinction indicating whether the user made the payment or performed the charge.

The item "transaction amount" is the amount of the payment made by the user or the amount of the charge performed by the user.

The item "balance" is the balance of value recorded on the IC chip 12 of the electronic money medium of the user after the payment or the charge, and is recorded after the payment or the charge is performed by the shop terminal 8.

The transaction history DB is configured as described above. Using these pieces of information, whether the user satisfies conditions as an object to be provided with guidance information can be checked, or whether the user made a payment within the expiration date of the guidance information can be checked.

FIG. 7B is a diagram showing an example of logical configuration of the basic condition DB.

The basic condition DB is a database in which guidance contents to be output at a guidance source franchisee 81, a condition for outputting the guidance contents, and the like are set. The basic condition DB includes a "guidance source franchisee name," a "guidance source franchisee ID," a "guidance ID," a "guidance destination franchisee name," a "guidance destination franchisee ID," a "guidance content," an "output condition," a "special condition ID," and other items.

The item "guidance source franchisee name" is the name of the franchisee 81 that outputs guidance as a customer sending source. The item "guidance source franchisee ID" is the franchisee ID of the franchisee 81. In the example of FIG. 7B, "Yamada Set Meals" is the guidance source franchisee 81.

The item "guidance ID" is ID information given to guidance information formed by the following items.

The item "guidance destination franchisee name" is the name of a franchisee 81 as a customer sending destination. The item "guidance destination franchisee ID" is the franchisee ID of the franchisee 81.

Incidentally, the item "guidance destination franchisee ID" allows a single franchisee ID or a plurality of franchisee IDs to be registered therein. When a single franchisee ID is registered, a specific franchisee 81 of a chain can be set as a customer sending destination, as in "a 10% rebate at Cacao Coffee Shop in front of Shinjuku Station," for example. When a plurality of franchisee IDs are registered, a plurality of franchisees 81 of a chain can be set as customer sending destinations, as in "a 10% rebate at all shops of Cacao Coffee Shop," for example.

The item "guidance content" is a guidance method and contents of guidance to be provided to a user.

For example, in the case of "Cacao Coffee Shop" in FIG. 7B, the guidance method is "print coupon information," which means printing onto a receipt 82.

Though partially omitted in FIG. 7B, the guidance contents are contents printed on a receipt 82, such for example as "a 5% rebate at all shops of Cacao Coffee Shop from August 1 to August 5."

Similarly, in the case of "Wheat Noodles Nakaumi," "We have reopening presents for you" is printed on a receipt 82. In the case of "Big Steak," an electronic mail reading "August 2 is the Big Steak day. A 5% rebate." is transmitted to a user.

Thus the guidance information can also be provided by electronic mail.

The item "output condition" is a condition for providing the guidance information to a user.

For example, in the case of the guidance ID "001," using the guidance source franchisee 81 by a user ten times or more within three months of most recent use is the condition for outputting the guidance information. This can be determined on analysis of a transaction history on the basis of the electronic money functional section ID of the user.

The item "special condition ID" is ID information for referring to the special condition DB when a special condition is further imposed in addition to the output condition. "None" is entered when no special condition is imposed.

As will be described in the following, the output condition can be set in more detail by special conditions such as weather, the gender of the user, and the like.

FIG. 8A is a diagram showing an example of logical configuration of the special condition DB.

The special condition DB specifies the condition for outputting the guidance information in more detail. The special condition DB includes a "special condition ID," an "area," a "weather," a "gender," an "age," a "time," and other items.

The item "special condition ID" is ID information given to special conditions formed by the following items.

The item "area" limits the location of a franchisee 81 as a guidance destination.

The location can be for example limited by using a distance from a guidance source franchisee 81 as in "introduce a shop within a radius of 1 km of the location of the guidance source franchisee," setting a certain station as a reference and using a time taken to walk from the station, or using a distance from the station or the like.

The item "weather" specifies a weather condition when the guidance information is output. For example, the weather condition of a special condition ID "002" is "fair," and thus a fair weather at a time of payment at the guidance source franchisee 81 is the condition for outputting the guidance information.

The item "gender" is the gender of the user. In the case of a special condition ID "001," the gender is "male," and thus a condition that the user be a male is the condition for outputting the guidance information.

The item "age" is the age of the user. In the case of the special condition ID "001," the age is "20's to 40's," and thus a condition that the age of the user is 20's to 40's is the condition for outputting the guidance information.

The item "time" is a date and time when a payment is made at the guidance source franchisee 81. In the case of the special condition ID "001," the time is "weekday 10 to 12 o'clock," and thus a condition that a payment is made at 10 to 12 o'clock on weekdays is the condition for outputting the guidance information.

FIG. 8B is a diagram showing an example of logical configuration of the guidance history DB.

The contents of guidance logs transmitted by franchisees 81 are read from the guidance logs and recorded in the guidance history DB. The guidance history DB includes a "guidance ID," an "output time," an "output destination electronic money functional section ID," a "guidance content," an "expiration date," and other items.

The item "guidance ID" is ID information of guidance information output to a user.

The item "output time" is a date, hours, minutes, and seconds when the guidance information was output to the user.

The item "output destination electronic money functional section ID" is the electronic money functional section ID of an electronic money medium used by the user for a payment.

The item "guidance content" is the contents of the guidance output to the user.

The item "expiration date" is the expiration date of a bonus (for example a rebate) according to the guidance.

Though not shown, the user DB stores basic information on users such as name, address, age, gender and the like, the electronic money functional section IDs of electronic money media possessed by the users, electronic mail addresses of portable telephones 7 and user terminals 9, and the like.

The value gift information DB will be described later.

The operation of the electronic money system 1 formed as described above will next be described.

Figure 9:
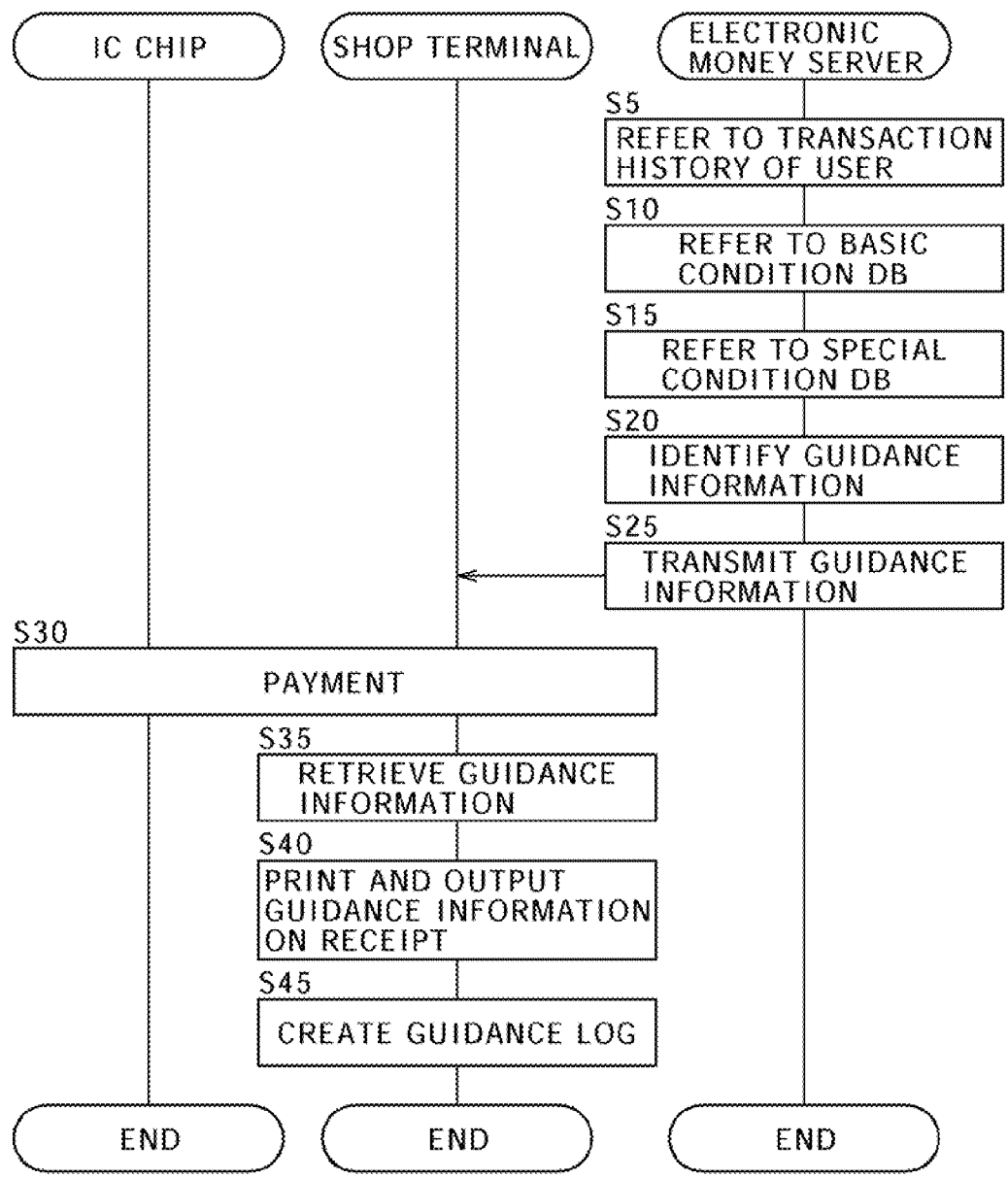
FIG. 9 is a flowchart of assistance in explaining a procedure for outputting guidance information to a user.
Figure 10:
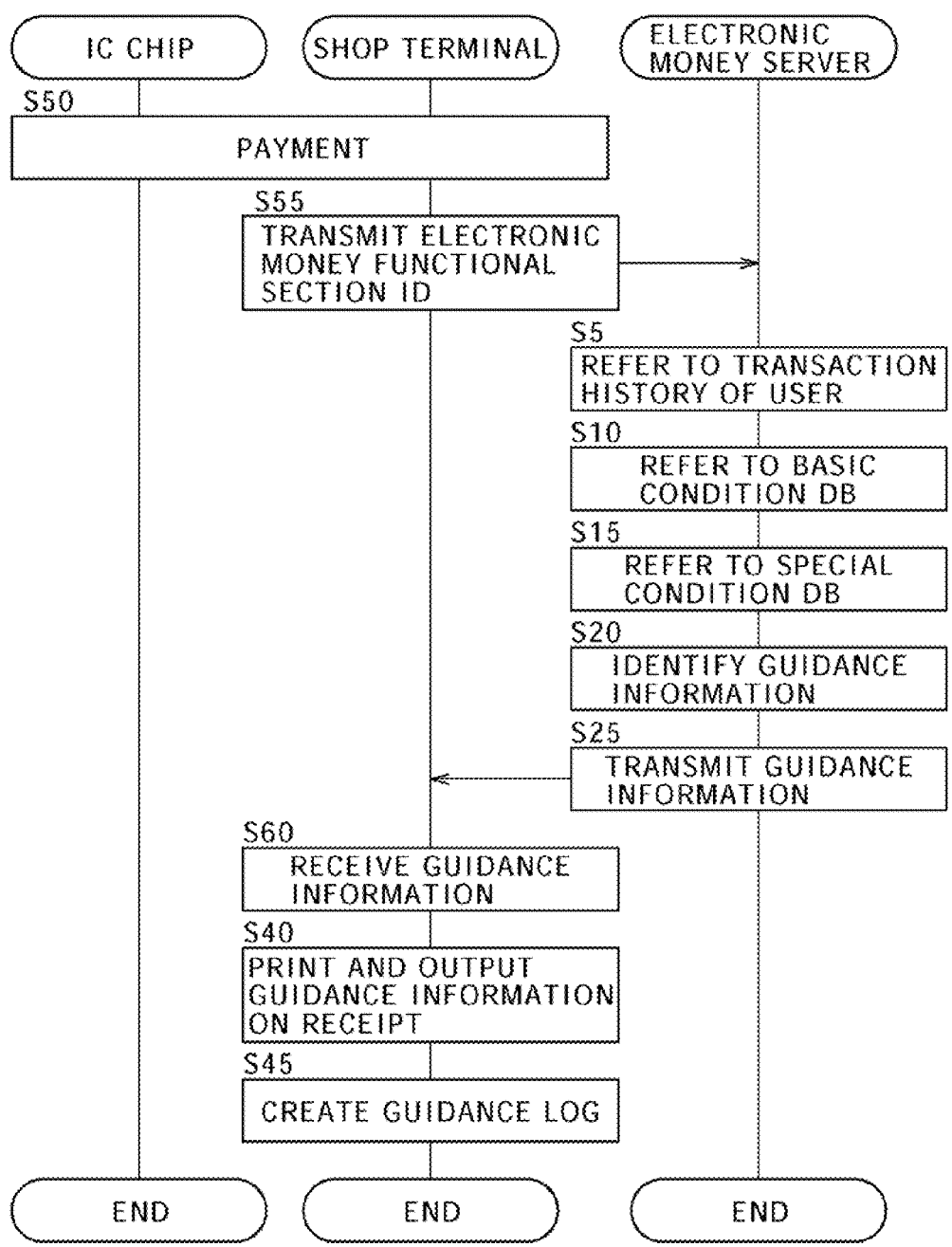
FIG. 10 is a flowchart of assistance in explaining an example of modification of the procedure for outputting guidance information to a user.
Figure 11:
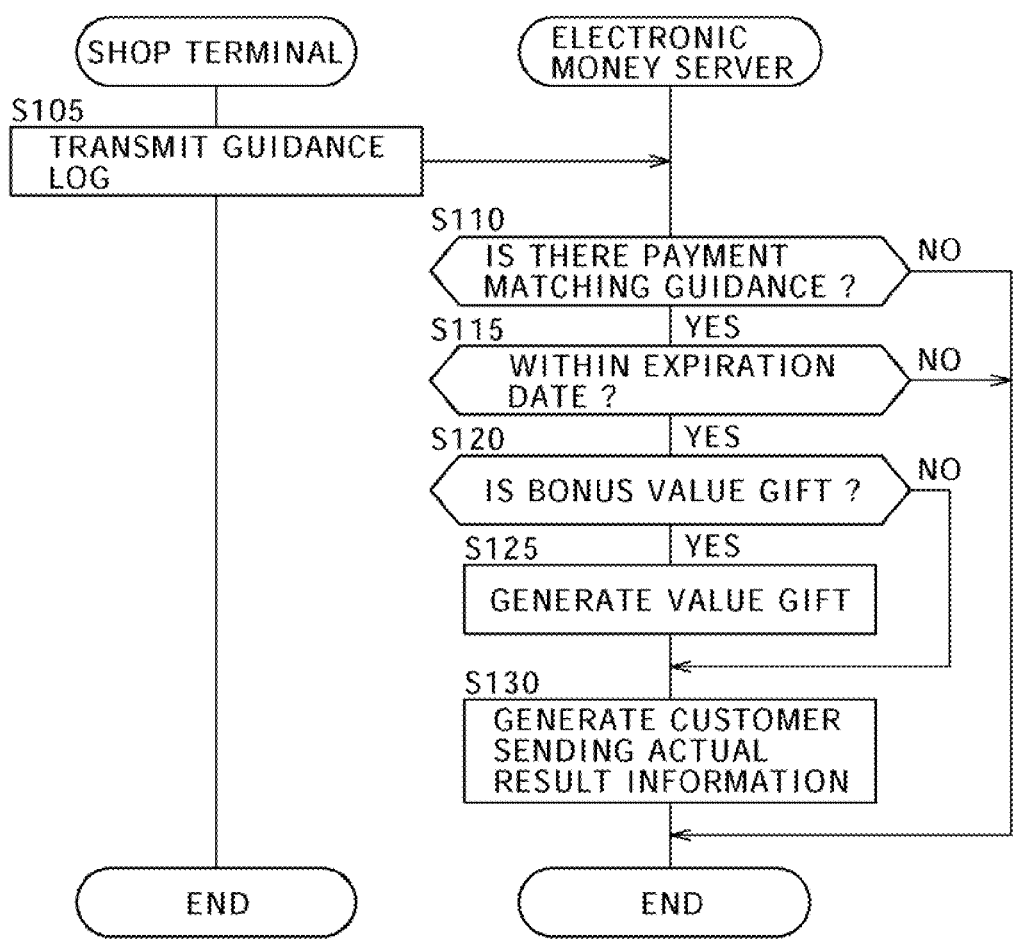
FIG. 11 is a flowchart of assistance in explaining a process performed by the electronic money system after guidance information is output.
Figure 12:
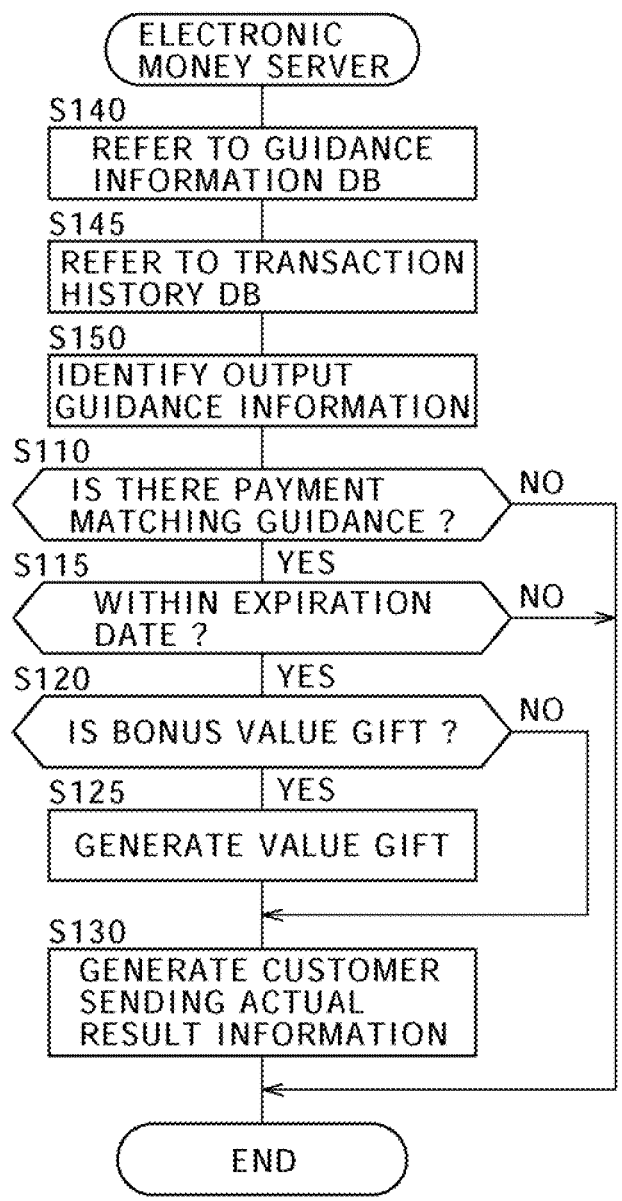
FIG. 12 is a flowchart of assistance in explaining an example of modification of the process performed by the electronic money system after guidance information is output.
Figure 13:
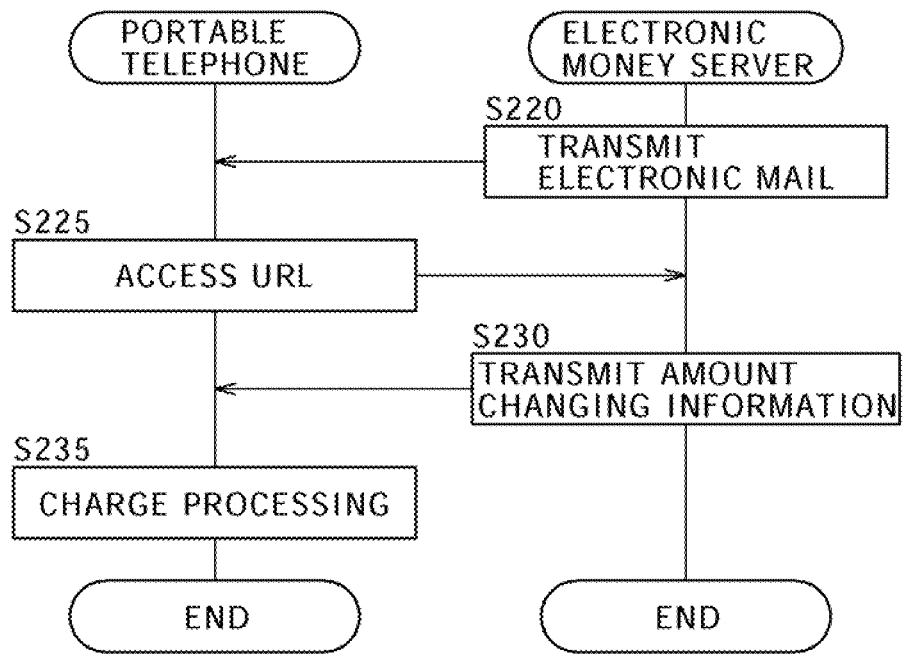
FIG. 13 is a flowchart of assistance in explaining a method for providing a value gift.
Figure 14:
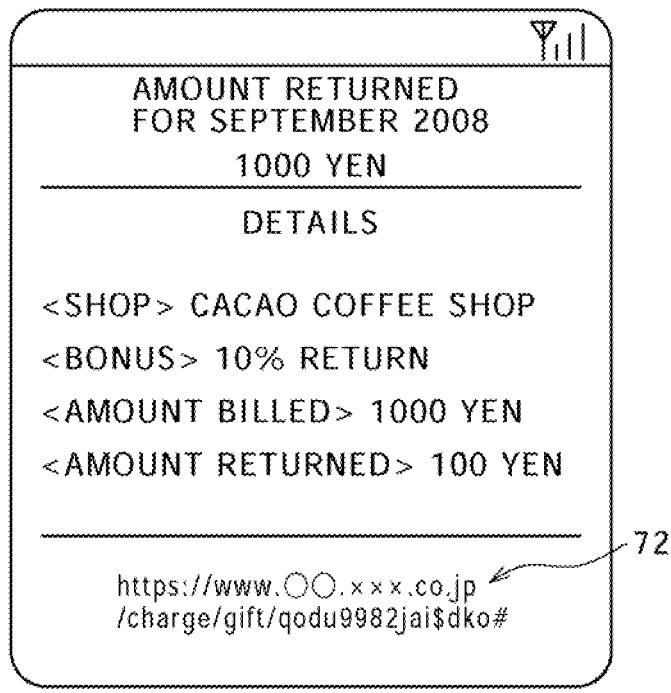
FIG. 14 is a diagram showing an example of a value gift notifying email.

FIG. 9 is a flowchart of assistance in explaining a procedure in which the electronic money system 1 outputs guidance information to a user.

The following process is performed by a CPU formed in the IC chip 12 of an electronic money medium, the CPU 31 of a shop terminal 8, and the CPU 51 of the electronic money server 2 according to a predetermined program.

First, the electronic money server 2 receives a transaction log from the shop terminal 8, and stores the transaction log in the transaction history DB.

Thus, the electronic money server 2 has transaction information receiving means for receiving transaction information in which contents of processing performed with the IC chip 12 is recorded from the shop terminal.

Next, the electronic money server 2 refers to a transaction history in the transaction history DB (step 5), and refers to the basic condition DB to check whether the transaction history of the user matches an output condition specified in the basic condition DB (step 10).

For example, in the basic condition DB of FIG. 7B, when the user used a franchisee 81 with a franchisee ID "6542" among branch shops of "Yamada Set Meals" ten times or more within three months of most recent use, the condition with the guidance ID "001" is satisfied.

In this case, a condition stored in the basic condition DB functions as a selection criterion for selecting a guidance destination shop on the basis of the contents of the transaction information. Thus, the electronic money server 2 has selection criterion storing means.

Next, when the basic condition DB further imposes a special condition, the electronic money server 2 refers to the special condition DB, and checks whether the corresponding condition is satisfied (step 15).

Then, when the transaction history of the user or the like satisfies the basic condition, the special condition and the like, the electronic money server 2 refers to the basic condition DB to identify guidance information for the user (step 20).

Next, when the user satisfies the output condition for outputting the guidance information, the electronic money server 2 generates the guidance information, and stores the guidance information on a storage medium such as the RAM 54 (FIG. 5) or the like.

The stored guidance information is associated with the electronic money functional section ID of the IC chip 12 of the user to be guided.

Thus, the electronic money server 2 has associating means for comparing the transaction information (transaction history) with the selection criterion (the basic condition DB and the special condition DB), and associating the ID information of the IC chip 12 with the guidance information.

The electronic money server 2 also has guidance information storing means for storing the guidance information associating the ID information (electronic money functional section ID) with the guidance information of a shop belonging to a group.

The electronic money server 2 repeats the above process, accumulates pieces of guidance information for transmission on the storage medium, and transmits these pieces of guidance information to the shop terminal 8 when the shop terminal 8 is connected to the electronic money server 2 (step 25).

The shop terminal 8 as transmission destination is all of shop terminals 8 of the franchisee 81 to which the guidance information is output. For example, when the franchisee 81 has three shop terminals 8 in a payment area, the electronic money server 2 transmits the guidance information to the three shop terminals 8. This makes it possible to respond regardless of which of the shop terminals 8 is used to make a payment when the user next visits the franchisee 81.

Thus, the electronic money server 2 has guidance information transmitting means for transmitting, to the shop terminals of one shop (guidance source franchisee 81), guidance information for a shop (guidance destination franchisee 81) other than the shop (guidance source franchisee 81).

In addition, the electronic money server 2 transmits the customer sending destination information to the shop terminal of a shop in which the shop terminal 8 that has transmitted the ID information (electronic money functional section ID) a predetermined number of times or more is installed, such as the franchisee 81 "used ten times or more within three months" as a condition.

Then, receiving the guidance information from the electronic money server 2, the shop terminal 8 stores the guidance information in the data storing section 44 (FIG. 4).

Thus, the shop terminal 8 has guidance information storing means for storing the guidance information associated with the ID information (electronic money functional section ID) in advance.

When the user thereafter visits the franchisee 81 and makes a payment, the user sets the electronic money medium on the shop terminal 8, and a person in charge at the franchisee 81 operates the shop terminal 8 to make the shop terminal 8 perform a payment process (step 30).

Then, the shop terminal 8 reads the electronic money functional section ID from the IC chip 12 included in the electronic money medium, identifies the IC chip 12, and inputs amount changing information for an amount of payment to the IC chip 12 to make the IC chip 12 decrease an amount of value.

Thus, the shop terminal 8 has ID information reading means for reading the ID information (electronic money functional section ID) from the IC chip 12 possessed by the user and amount processing means for inputting the amount changing information to the IC chip 12 to change the amount of monetary value stored by the IC chip 12.

Then, the shop terminal 8 generates a transaction log in which the electronic money functional section ID of the IC chip 12, the franchisee ID of the franchisee 81, the shop terminal ID of the shop terminal 8, a transaction date and time, a transaction type, a transaction amount, a balance and the like are recorded, and stores the transaction log in the data storing section 44 (FIG. 4).

The transaction log stored in the data storing section 44 is later transmitted to the electronic money server 2 en bloc by batch processing at a time of closing of the shop terminal 8, for example.

The shop terminal 8 thus creates the transaction log, and searches the data storing section 44 for the guidance information set in correspondence with the electronic money functional section ID of the IC chip 12 using the electronic money functional section ID of the IC chip 12 (step 35).

Then, when the guidance information set in correspondence with the electronic money functional section ID is present, at a time of printing the contents of the payment on a receipt 82, the shop terminal 8 reads the guidance information from the data storing section 44, and prints the guidance information together with the contents of the payment (step 40).

Thus, the shop terminal 8 has guidance information outputting means for outputting the guidance information for guidance to another shop included in the group to the read ID information (electronic money functional section ID).

After printing the guidance information, the shop terminal 8 generates a guidance log in which the guidance ID of the guidance information, an output time, the electronic money functional section ID of the IC chip 12, guidance contents (including information identifying a guidance destination franchisee 81), the expiration date of a bonus associated with the guidance, and the like are recorded (step 45), and stores the guidance log in the data storing section 44 (FIG. 4).

The guidance log stored in the data storing section 44 is later transmitted to the electronic money server 2 en bloc by batch processing at a time of closing of the shop terminal 8, for example.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing device comprising:
   identification information obtaining means for obtaining identification information from an integrated circuit chip;
   guidance information outputting means for outputting guidance information of a shop for the obtained identification information, the location of the shop limited by a location condition based on at least one of a distance, an area, and a travel time; and
   guidance completion information transmitting means for transmitting guidance completion information including (i) the obtained identification information and (ii) a confirmation that the guidance information identifying the shop and the location of the shop to a server after the guidance information is output by the guidance information outputting means; and
   monetary value changing means for outputting monetary value changing information to the integrated circuit chip having storing means for rewritably storing monetary value information indicating monetary value, and making the monetary value information stored by the storing means of said integrated circuit chip changed,
   wherein when the monetary value information is changed by the monetary value changing means, the identification information obtaining means obtains the identification information to identify the integrated circuit chip.

2. The information processing device according to claim 1, further comprising
   guidance information storing means for storing guidance information corresponding to identification information,
   wherein said guidance information outputting means obtains the guidance information for the obtained identification information from the guidance information storing means, and outputs the guidance information.

3. The information processing device according to claim 1, further comprising
   identification information transmitting means for transmitting the obtained identification information to the server, wherein the guidance information outputting means obtains the guidance information for the transmitted identification information from the server, and outputs the guidance information.

4. An information processing server comprising:
identification information receiving means for receiving identification information from an information processing device, the information processing device being installed in a shop and obtaining the identification information from an integrated circuit chip;
guidance completion information receiving means for receiving guidance completion information from an information processing device installed in a shop as a guidance source, the guidance completion information including:
(i) identification information obtained by the information processing device, and
(ii) a confirmation, after guidance to the guidance destination has been output by the information processing device, for the identification information, the confirmation confirming that guidance destination shop identifying information identifying a shop as a guidance destination and a location of the shop, the location of the shop limited by a location condition based on at least one of a distance, an area, and a travel time; and
comparing means for comparing the guidance completion information received from the information processing device of the shop as the guidance source with identification information received from the information processing device of the shop as the guidance destination.

5. The information processing server according to claim 4, further comprising:
group information storing means for storing group information about a group to which the shops belong;
group guidance information storing means for storing group guidance information associating identification information with guidance information of the shops belonging to the group; and
group guidance information transmitting means for transmitting, to an information processing device installed in one shop, guidance information of a shop other than the shop on a basis of the group guidance information.

6. The information processing server according to claim 5, wherein when said identification information receiving means receives, from one information processing device, identification information obtained by the information processing device, and the group guidance information transmitting means transmits the group guidance information to the information processing device.

7. The information processing server according to claim 4, further comprising:
monetary value changing information generating means for generating monetary value changing information for changing the monetary value information stored by the integrated circuit chip from an information processing device that received the group guidance information from the group guidance information transmitting means on a basis of a result of comparison by the comparing means; and
monetary value changing information transmitting means for transmitting the generated monetary value changing information to the information processing device.

8. An information processing device comprising:
an identification information obtaining section configured to obtain identification information from an integrated circuit chip;
a guidance information outputting section configured to output guidance information of a shop for the obtained identification information, the location of the shop limited by a location condition based on at least one of a distance, an area, and a travel time; and
a guidance completion information transmitting section configured to transmit guidance completion information including (i) the obtained identification information and (ii) a confirmation that the guidance information identifying the shop and the location of the shop to a server after the guidance information is output by the guidance information outputting section; and
a monetary value changing section configured to output monetary value changing information to the integrated circuit chip having a storing section configured to rewritably store monetary value information indicating monetary value, and making the monetary value information stored by the storing section of said integrated circuit chip changed,
wherein when the monetary value information is changed by the monetary value changing section, the identification information obtaining section obtains the identification information to identify the integrated circuit chip.

9. An information processing server comprising:
an identification information receiving section configured to receive identification information from an information processing device, the information processing device being installed in a shop and obtaining the identification information from an integrated circuit chip;
a guidance completion information receiving section configured to receive guidance completion information from an information processing device installed in a shop as a guidance source, the guidance completion information including:
(i) identification information obtained by the information processing device, and
(ii) a confirmation, after guidance to the guidance destination has been output by the information processing device, for the identification information, the confirmation confirming that guidance destination shop identifying information identifying a shop as a guidance destination and a location of the shop, the location of the shop limited by a location condition based on at least one of a distance, an area, and a travel time; and
a comparing section configured to compare the guidance completion information received from the information processing device of the shop as the guidance source with identification information received from the information processing device of the shop as said guidance destination.

10. The information processing device according to claim 8, further comprising:
a guidance information storing section configured to store guidance information corresponding to identification information,
wherein said guidance information outputting section obtains the guidance information for the obtained identification information from the guidance information storing section, and outputs the guidance information.

11. The information processing device according to claim 8, further comprising:
an identification information transmitting section configured to transmit the obtained identification information to the server, wherein the guidance information outputting section obtains the guidance information for the transmitted identification information from the server, and outputs the guidance information.

12. The information processing server according to claim 9, further comprising:
a group information storing section configured to store group information about a group to which the shops belong;
a group guidance information storing section configured to store group guidance information associating identification information with guidance information of the shops belonging to the group; and
a group guidance information transmitting section configured to transmit, to an information processing device installed in one shop, guidance information of a shop other than the shop on a basis of the group guidance information.

13. The information processing server according to claim 12,
wherein when said identification information receiving section receives, from one information processing device, identification information obtained by the information processing device, and the group guidance information transmitting section transmits the group guidance information to the information processing device.

14. The information processing server according to claim 9, further comprising:
a monetary value changing information generating section configured to generate monetary value changing information for changing the monetary value information stored by the integrated circuit chip from an information processing device that received the group guidance information from the group guidance information transmitting section on a basis of a result of comparison by the comparing section; and
a monetary value changing information transmitting section configured to transmit the generated monetary value changing information to the information processing device.

15. An information processing method comprising:
obtaining identification information from an integrated circuit chip;
outputting guidance information of a shop for the obtained identification information, the location of the shop limited by a location condition based on at least one of a distance, an area, and a travel time; and
transmitting guidance completion information including (i) the obtained identification information and (ii) a confirmation that the guidance information identifying the shop and the location of the shop to a server after the guidance information is output; and
outputting monetary value changing information to the integrated circuit chip having a storing section configured to rewritably store monetary value information indicating monetary value, and making the monetary value information stored by the storing section of said integrated circuit chip changed,
wherein when the monetary value information is changed, the identification information to identify the integrated circuit chip is obtained.

16. An information processing method comprising:
receiving identification information from an information processing device, the information processing device being installed in a shop and obtaining the identification information from an integrated circuit chip;
receiving guidance completion information from an information processing device installed in a shop as a guidance source, the guidance completion information including:
(i) identification information obtained by the information processing device, and
(ii) a confirmation, after guidance to the guidance destination has been output by the information processing device, for the identification information, the confirmation confirming that guidance destination shop identifying information identifying a shop as a guidance destination and a location of the shop, the location of the shop limited by a location condition based on at least one of a distance, an area, and a travel time; and
comparing the guidance completion information received from the information processing device of the shop as the guidance source with identification information received from the information processing device of the shop as said guidance destination.

* * * * *